Oct. 3, 1933.  W. NOBLE  1,928,907
HEATER CONTROL
Filed March 26, 1930
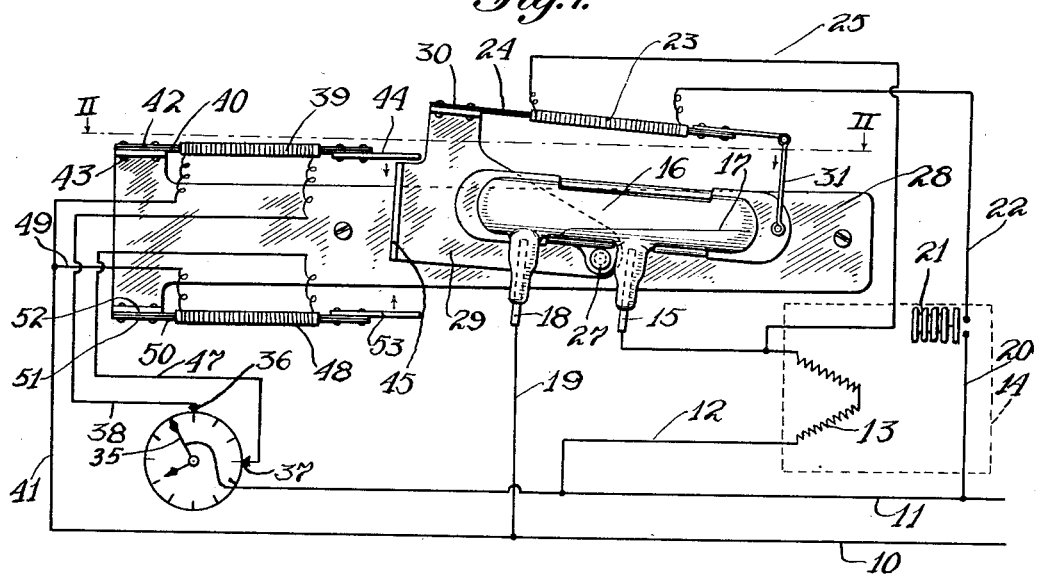
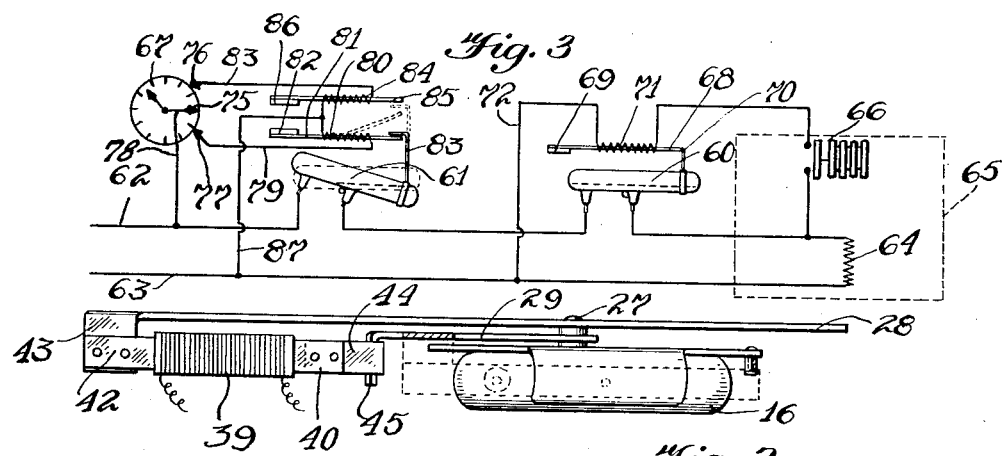
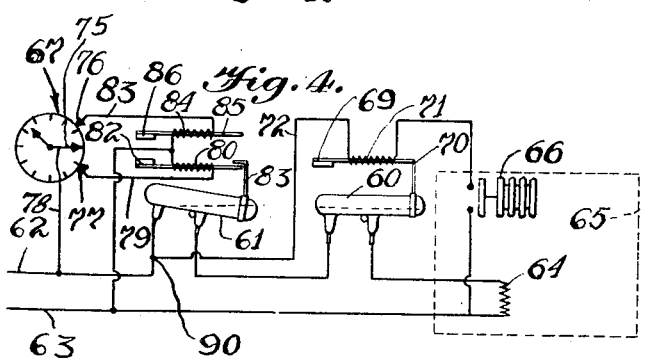
INVENTOR
Warren Noble
BY Charles O. Hill
ATTORNEYS Patented Oct. 3, 1933

1,928,907

UNITED STATES PATENT OFFICE 1,928,907

HEATER CONTROL

Warren Noble, Detroit, Mich., assignor to Electromaster, Inc., Detroit, Mich., a corporation of Michigan Application March 26, 1930. Serial No. 439,249

4 Claims. (Cl. 200—122)

This invention relates to a thermostatically controlled switch construction and more particularly to an arrangement for controlling the flow of current to an electrical heating element, as, for instance, the burner in the oven of a cooking range.

An object of the ivention is to provide a thermostatic mechanism for controlling the rate of current flow to the burner as well as to provide a suitable means for use with timed mechanisms for establishing a current flow to said burner for a predetermined interval of time.

Another object is to provide an automatically functioning switch mechanism for maintaining a substantially constant predetermined temperature within an oven and to combine the switch mechanism which accomplishes this with a further mechanism operative to regulate the particular interval of time when the automatically functioning regulating means is called upon to function.

A still further object is to provide a switch in an electrical supply line and thermostatic means operative in accordance with the temperature of an oven to control the rate of flow to the heating element of the oven and to provide a suitable means for operating the switch to make and break the circuit to the heating element in accordance with the setting of a timed mechanism such as a clock.

In accordance with the general features of the invention there is provided a plurality of shunt circuits from a main circuit leading to the electric heating element or burner of an oven, two of said shunt circuits having delegated to them the duty of establishing and breaking the circuit to said burner in accordance with the operation of a timed mechanism as determined by individual settings, and another of said shunt circuits performing the function of metering current to the heating element in accordance with the temperature within the oven; all of said shunt circuits being arranged to operate on a central switch through the medium of thermostats.

Other objects and features of my invention will more fully appear from the following detailed description taken in connection with the accompanying drawing which illustrates several embodiments thereof and in which:

Figure 1 is a diagrammatic view of an electrical control circuit embodying the features of this invention for controlling the operation of a burner such as is used in an oven;

Figure 2 is a fragmentary view partly in section taken on substantially the line II—II of Figure 1 looking in the direction indicated by the arrows;

Figure 3 is a diagrammatic view of a modification of the invention in which two mercury switches are used in place of one to accomplish the desired control of the heater element;

Figure 4 is a diagrammatic view of a still further modification of the invention in which the oven controlled thermostat receives its current from a circuit connected directly to the power lead lines.

The reference characters 10 and 11 designate the power or electrical supply lines for supplying energy to the controlling circuits. These lines have shunted across them three circuits, two of which shunt circuits are clock controlled and the other of which is controlled by the thermostat in the oven.

Connected to the power line 11 is a conductor 12 which includes the heater element or burner 13 disposed in the oven which is shown in Figure 1 in dotted lines and which is designated by the reference character 14. The other end of the conductor 12 is connected to a terminal 15 which extends into a tube 16 of a mercury switch for cooperation with a globule of mercury 17 in the usual way. This mercury 17 is adapted to establish electrical connection between the terminal 15 and a terminal 18 connected to the tube 16 and having secured to it one end of a conductor 19 connected at its other end to the power line 10. Now it will be evident that when the tube 16 is pivoted so as to cause the terminals 15 and 18 to be connected power will be supplied from the lines 10 and 11 to the heater element 13 for heating said element. On the other hand, when the switch 16 is in position shown in Figure 1 the circuit for the element 13 is broken and there is no current supplied thereto.

Also connected to the supply line 11 is a conductor 20 which extends to an expansible bellows 21 disposed in the oven 14 and is adapted to be connected by this bellows 21 to one end of a conductor 22 the other end of which is connected to a resistance wire 23 surrounding a thermostatic element 24 made of the usual bi-metallic material. The other end of the coil 23 is connected by a conductor 25 to the terminal 15 of the mercury switch.

The expansible bellows 21 is of a conventional construction and includes thermally sensitive fluid adapted upon the heating of the oven 14 to a predetermined degree to expand the bellows and connect the two conductors 20 and 22 whereby if the mercury switch is in its closed position current will flow through the element 23 to deflect the thermostatic switch 24 in a direction toward the mercury switch so as to move the switch about its pivot pin 27.

The tube 16 is pivotally supported on pin 27 which is carried by a supporting plate 28. Also connected to the pivot pin 27 is a bracket 29 which has fastened to it one end of the thermostatic element 24 as indicated at 30. The other end of the thermostatic element 24 is pivotally connected by link 31 to the tube 16 so that the tube may move with the bracket 29 about the pin 27 when the bracket is actuated by the clock-controlled mechanism to be described hereinafter.

The supply line 11 has also connected to it a hand 35 of a conventional clock construction, which hand for example may comprise the minute hand of the clock. This hand 35 is so arranged that it is adapted to make electrical contact with either of two contact points 36 and 37 as it turns clockwise. These contact points, of course, may be adjusted to different positions in a manner well known to those familiar with such clock constructions and in Figure 1 assuming that the hand 35 is a minute hand it will be evident that it will take a quarter of an hour for the hand to travel from contact 36 to contact 37.

The contact 36 is connected by a conductor 38 to a resistance wire coil 39 surrounding a thermostatic or bi-metallic element 40. The circuit for this coil 39 is completed by conductor 41 connected to the power or supply line 10. One end of the element 40 is fastened at 42 to an ear 43 on the support 28 and the other end has fastened to it an extension 44 adapted when the thermostat flexes to move in the direction indicated by the arrow in Figure 1 to engage an ear 45 formed integral with the pivoted bracket 29 for the purpose of moving this end of the bracket downwardly to tilt the tube to its closed position.

The other contact point or terminal 37 is connected by conductor 47 to one end of a resistance coil 48 the other end of which is connected by a conductor 49 to the supply 10 thru the previously mentioned conductor 41. This coil 48 surrounds a bi-metallic element 50 fastened at 51 to an ear 52 formed on the support 28. The resistance wire coil 48 is adapted to heat the bi-metallic element when its circuit is closed for the purpose of causing the bi-metallic element to flex in a direction indicated by the arrow. The free end of the bi-metallic element 50 has fastened to it an extension 53 for engaging the ear 45 on the pivoted bracket 29 to move the bracket in such a direction as to open the mercury switch.

The operation of this form of my invention is briefly as follows:

Normally, when the circuit for the heating element of burner 13 is open, the mercury tube 16 will be in the position shown in Figure 1 at which time the mercury globule 17 will be out of contact with terminal 18. In order to start the oven heater the operator or housewife sets the clock so that contact is established between the arm 35 and terminal 36 whereby resistance coil 39 is heated and the bi-metallic element 40 is flexed in the direction indicated by the arrow to tilt the bracket 29 and the tube 16 carried thereby about the pivot 27. This tilting of the tube 16 brings it from its inclined or open position to a horizontal or closed position, thereby closing the circuit for the burner 13.

Now, if during the operation of the burner the temperature in the oven 14 should have reached a predetermined degree, the expansible bellows 21 is operated, thereby closing the circuit for the heating coil 23 which flexes the bi-metallic element 24 in the direction indicated by the arrow, thereby moving the tube back into its inclined or open position. As soon as the temperature in the oven 14 drops below the predetermined degree, the expansible bellows 21 collapses and breaks the circuit for the heater 23 whereby the bi-metallic element 24 will return to its normal position bringing with it the tube 16 and thereby closing the circuit for the heater element 13. From the foregoing it will be evident that the expansible bellows 21 is in reality an oven thermostat for regulating the temperature of the oven 14. Any suitable means may be provided for adjusting the expansible bellows for the purpose of varying the temperature at which it will operate to close the circuit for the heater element 23.

Also, at the same time as the operator sets the clock so as to close the circuit for the heater 39, she also sets the contact 37 so as to open the circuit for the heating element after the desired cooking period has expired. For example, if the article to be cooked requires a cooking operation of 15 minutes, the contact 37 will be positioned a quarter of a turn to the right of contact 36 whereby upon movement of the contact arm 35 from contact 36 to contact 37, the electrical circuit for the heater 48 will be closed. Obviously, the heating of the bi-metallic element 48 results in its flexing in the direction indicated by the arrow, thus tilting the bracket 29 and the tube 16 about the pivot 27. This brings the tube 16 back into its inclined or open position at which time the circuit for the heating element of burner 13 is again broken.

The above description of the operation of the present control system clearly indicates that there is provided a single mercury switch for carrying out the dictates of the oven thermostat 21 and the timing device for the heating element 13. The circuits for the three heaters as well as that for the heating elements 13 are all shunted across the supply lines 10 and 11. Also, it should be noted that even though the thermostatic element 40 has caused the bracket 29 to be pivoted to its horizontal position, still the tube 16 may be moved relative to the bracket 29 back into its inclined position by the flexing of the bi-metallic element 24. That is to say, the tube 16 is movable with the bracket 29 and is also movable relative to the bracket 29 in the event that the oven thermostat 21 is brought into operation.

In Figure 3 there is illustrated a modification of the invention in which two mercury switches 60 and 61 take the place of a single mercury switch. These switches have their contacts connected in series to the common supply line 62. The two supply lines 62 and 63 are connected to the heater element 64 in an oven 65 designated by the dotted lines in Figure 3. The switch 60 is controlled by the oven thermostat 66 which, like the device 21 in Figure 1, may comprise a thermally expansible bellows of a well known construction. The switch 61, on the other hand, is adapted to be controlled by suitable timing device designated generally by the reference character 67.

The tilting of the switch 60 is effected by a thermostatic or bi-metallic element 68 which may be associated with the switch 60 in the same way that the element 24 is associated with the tube 16 in Figure 1. One end of this element 68 is fixedly supported at 69 and the other end is connected at 70 to the switch 60. The element 68 is adapted to be heated by a resistance coil or heater 71 comprising part of a conductor 72 which is connected at one end to the line 63 and at its other end is connected thru the oven thermostat 66 to the line 62. Obviously, if the oven 65 is heated beyond a predetermined degree, the thermally sensitive element or oven thermostat 66 closes the circuit for the heater 71 and thereby causes the bi-metallic element 68 to flex in such a direction as to open the switch thereby breaking the circuit for the oven burner 64.

The timing mechanism 67 is similar to the timing mechanism described in connection with Figure 1 and includes a movable contact arm 75 and two adjustable contacts 76 and 77.

The contact arm 75 is connected by a conductor 78 to the supply line 62. The contact 77 is connected by conductor 79 to one end of heater coil 80 surrounding a bi-metallic or thermostatic element 81 rigidly fastened at 82 to a suitable support. The free end of the thermostatic element 81 is adapted to flex upwardly to the dotted position shown in Figure 3 upon the heating of coil 80 for the purpose of engaging the bent arm 83 connected to switch 61 and tilting the mercury switch to its horizontal or closed position. In other words, in order to complete the circuit for the burner 64 the arm 75 must first be moved into cooperation with the contact 77 to enable the movement of the switch 61 to its closed position.

The other contact 76 is connected by an electrical conductor 83 to one end of the heater 84 which surrounds a bi-metallic or thermostatic element 85 having one end fixedly secured at 86 to a suitable support. The free end of the element 85 is adapted to flex downwardly to engage the arm 83 when it is in its raised or dotted position for the purpose of tilting the switch back into its inclined or open position. This arrangement is such that the operator, by setting the contact 76 in a given position may cause the burner circuit to be broken after a predetermined heating period. The other end of the two heaters 80 and 84 are connected by common conductor 86 to the supply line 83 thus completing the circuit for the heater. The operation of this modification of the invention is substantially the same as that of the form of the invention shown in Figure 1, with the exception that separate switches 60 and 61 are provided to take the place of the single switch in Figure 1. Obviously, in order for the circuit for the burner 64 to be closed, both switches 60 and 61 must be in their closed or horizontal positions. If the oven thermostat 66 moves the switch 60 to its inclined or open position, the circuit is broken. Also, if the timing device 67 causes the switch 61 to be moved to its inclined or open position, the circuit for the burner 64 is broken.

In Figure 4, I have illustrated a modification of the invention which is substantially identical with that shown in Figure 3 with the exception that the circuit for the heater 71 is not connected to the supply line through the switch 61. That is to say, the circuit for this heater 71 is shunted directly across the supply leads 62 and 63. This is accomplished by connecting one end of the conductor 72 of the circuit for this heater directly to supply line 63 and connecting the other end of this conductor 72 to the supply line 62 before the connection between this supply line and switch 61 as indicated at 90.

The operation of this form of the invention is substantially the same as that of the form shown in Figure 3 with the exception that the oven thermostat 66 can operate the switch 60 independently of the circuit for the switch.

Now, I desire it understood that although I have illustrated and described in detail the preferred embodiments of my invention, the invention is not to be thus limited but only insofar as defined by the scope and spirit of the appended claims.

What I claim is:

1. A device of the character described comprising a support, a switch pivoted on said support and having parts arranged to open and close an electric circuit in response to pivotal movement, main thermostatic means to actuate the switch to open position and closed position, and auxiliary thermostatic means to actuate the switch to open and closed positions independently of the first thermostatic means after said first thermostatic means has actuated the switch to closed position.

2. A device of the character described comprising a support, a bracket pivoted on said support, a mercury switch pivoted on said support, thermostatic means including a bi-metallic strip interconnecting said bracket and switch, whereby the switch may be pivoted relative to the bracket to open and closed positions, and other thermostatic means operable to pivot the bracket and switch as a unit to cause the switch to assume open and closed positions.

3. A heater control comprising a support, a bracket pivoted on said support, a mercury switch pivoted on said support, the pivots of the bracket and switch being coincident, a bi-metallic strip connected between the switch and bracket, a resistance coil operatively associated with said bi-metallic strip, whereby the strip may be deflected to pivot the switch relative to the bracket to open and closed positions, and other thermostatic means operative to move the bracket about its pivot, whereby the bracket and switch may be pivoted as a unit relative to the support to cause the switch to assume open and closed positions.

4. A heater control comprising a support, a bracket pivoted on the support, a mercury switch pivoted on said support, the pivots of the bracket and switch being coincident, a bi-metallic strip interconnecting the bracket and switch and adapted to pivot the switch relative to the bracket in response to temperature changes, whereby the switch is actuated to open and close an electric circuit, a pair of thermostatic strips mounted on said support in such a manner that their outer ends bear against the bracket, said strips being disposed so as to deflect in opposite directions in response to temperature changes, and means to selectively heat said pair to pivot the bracket and switch as a unit to cause the switch to assume an open and closed position.

WARREN NOBLE.